United States Patent Office 3,642,860
Patented Feb. 15, 1972

3,642,860
COPLYMERS OF N-(2-CYANOETHYL) AZIRIDINES AND β-LACTONES
Laurence I. Peterson, Framingham, Mass., and Louisa J. Sauro, Midland, Mich., assignors to The Dow Chemical Company, Midland, Mich.
No Drawing. Filed Dec. 30, 1968, Ser. No. 787,992
Int. Cl. C07c 121/00, 121/28
U.S. Cl. 260—465.4
8 Claims

ABSTRACT OF THE DISCLOSURE

Novel copolymers are prepared in the reaction between (a) β-propiolactone, β-isobutyrolactone, or β-neopentanolactone, and (b) a compound of the formula

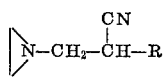

wherein R is hydrogen or lower alkyl. The copolymers are fungicides.

BACKGROUND OF THE INVENTION

Aziridine (ethylenimine) is known to copolymerize with β-propiolactone. See U.S. Pat. 3,375,231 and J. Polymer Sci., Part B, 3, 617 (1965), wherein the general reaction and solvent effects on that reaction are described. The copolymerization reaction between β-propiolactone and N-phenethylaziridine is described in our copending application entitled: "Copolymers of β-Lactones and N-Phenethylaziridines," filed concurrently herewith.

SUMMARY OF THE INVENTION

It has now been discovered that novel copolymers comprising ring-opened units of (a) β-propiolactone, β-isobutyrolactone or β-neopentanolactone, and (b) a compound of the formula

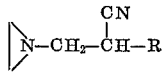

wherein R is hydrogen or lower alkyl, are prepared in the novel process comprising reacting by contacting (a) β-propiolactone, β-isobutyrolactone, or β-neopentanolactone with (b) a compound of the formula

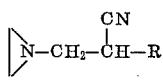

wherein R is hydrogen or lower alkyl, said reaction occurring at a temperature between about −20° C. and 100° C. in an inert solvent. The subject copolymers are useful as fungicides.

The reaction is exothermic. Accordingly, the reaction is advantageously conducted in an inert solvent, i.e. a solvent which does not react with either the β-lactone or aziridinyl reactants or the copolymer produced, so that the heat of reaction can be more readily dissipated and an explosive reaction avoided. Unlike the prior art teachings, the subject copolymer is formed independent of the dielectric constant of the solvent. Accordingly, suitable solvents include aromatic, alkaromatic and halogenated hydrocarbons, ethers, ketones and nitriles. Examples of suitable solvents include benzene, toluene, xylene, acetonitrile, dichloroethylene, diethyl ether, tetrahydrofuran and acetone. The preferred solvent is acetonitrile.

The structure of the copolymer is found to be a combination of random, ring-opened units of the β-lactone and aziridinyl reactants joined via amino and ester linkages, a result which is most surprising in view of the structure of copolymers of seemingly similar materials as taught by U.S. Pat. 3,375,231, i.e. ring-opened units joined through ether and amide linkages.

Examples of suitable aziridinyl reactants of the formula

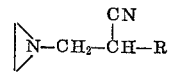

wherein R is hydrogen or lower alkyl, i.e. having from 1 to about 5 carbon atoms, include: N-(2-cyanoethyl) aziridine, N-(2-cyanopropyl)aziridine, N-(2-cyanoisoamyl)aziridine, N-(2-cyano-n-heptyl)aziridine, and other like compounds. Preferred reactants are N-(2-cyanoethyl) aziridine and N-(2-cyanopropyl)aziridine.

The reaction temperature is ordinarily between about −20° C. and 100° C. At temperatures below −20° C., the reaction rate is quite low, and at temperatures above about 100° C., the β-lactone homopolymerizes and precludes formation of the desired copolymer in best yields.

The molar proportion of β-lactone and aziridinyl reactants is suitably between about 1:20 and 20:1, and is preferably about 1:2 to 2:1.

SPECIFIC EMBODIMENTS

The following example further illustrates the invention:

(1) A solution of N-(2-cyanoethyl)aziridine (38.4 g., 0.4 mole) in 100 ml. of acetonitrile was added dropwise with stirring to a solution of β-propiolactone (28.8 g., 0.4 mole) in 200 ml. of acetonitrile maintained at 0°– 5° C. The resulting solution was stirred for 1 hr. at 0° C., for 3 hrs. at about 20° C., and then 3 hrs. at 50° C. The system was purged with nitrogen and the reaction mixture warmed to reflux temperature (86° C.) and maintained at that temperature for 2 hrs. After cooling the reaction mixture to room temperature, the volatile components were removed by warming the mixture under reduced pressure (50–60° C. at 20 mm.) to yield 67 g. of a yellow, opaque, gummy copolymer. The product was characterized by means of IR, NMR and microanalysis.

*Analysis.*—Calcd. for $C_8H_{12}O_2N_2$ (percent): C, 57.13; H, 7.19; N, 16.66 (mol. wt. 168). Found: (percent): C, 57.0; H, 7.19; N, 16.2 (mol. wt. 1850).

The above reaction product in a concentration of 400 parts per million by weight in nutrient agar medium was effective in killing or substantially reducing the growth of rice blast.

By proceeding substantially as described above, the following copolymers are obtained.

| Example | Reactants | | Molar ratio, a:b |
|---|---|---|---|
| | R | β-Lactone | |
| 2 | H | Propio- | 2:1 |
| 3 | H | do | 1:2 |
| 4 | H | Neopentanolactone | 1:2 |
| 5 | Methyl | do | 10:1 |
| 6 | Isopropyl | Isobutyro- | 1:5 |
| 7 | n-Amyl | Propio- | 1:1 |

We claim:
1. A copolymer of ring-opened units produced by reacting (a) β-propiolactone, β-isobutyrolactone or β-neopentanolactone with (b) a compound of the formula

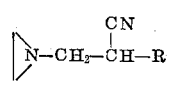

wherein R is hydrogen or lower alkyl; the reaction of (a) with (b) ocurring in the presence of an inert solvent at a temperature of from −20° C. to 100° C. and in a molar ratio of (a):(b) of from 1:20 to 100° C.

2. The copolymer defined in claim 1 wherein the molar ratio of (a):(b) is between 1:2 and 2:1.

3. The copolymer defined in claim 1 wherein R is hydrogen.

4. The copolymer defined in claim 1 wherein (a) is β-propiolactone.

5. The copolymer defined in claim 4 wherein R is hydrogen.

6. The copolymer defined in claim 5 wherein the molar ratio of (a):(b) is between 1:2 and 2:1.

7. The copolymer defined in claim 1 wherein the solvent is acetonitrile.

8. The copolymer defined in claim 7 wherein the temperature is between 0° C. and 50° C.

References Cited

UNITED STATES PATENTS 3,375,231   3/1968   Fukui et al. _____ 260—78.3

JOSEPH P. BRUST, Primary Examiner

U.S. Cl. X.R.

260—239 E, 343.9; 424—304

PO-1050
(5/69)

UNITED STATES PATENT OFFICE
CERTIFICATE OF CORRECTION

Patent No. 3,642,860      Dated 15 February 1972

Inventor(s) Laurence I. Peterson and Louisa J. Sauro

It is certified that error appears in the above-identified patent and that said Letters Patent are hereby corrected as shown below:

Column 2, line 70, change "ocurring" to --occuring--.
        line 72, delete "100° C." and insert --20:1--.

Signed and sealed this 29th day of August 1972.

(SEAL)
Attest:

EDWARD M. FLETCHER, JR.
Attesting Officer

ROBERT GOTTSCHALK
Commissioner of Patents